United States Patent
Izumi et al.

(10) Patent No.: US 10,538,058 B2
(45) Date of Patent: Jan. 21, 2020

(54) COMPOSITE BODY, HONEYCOMB STRUCTURE, AND METHOD FOR PRODUCING COMPOSITE BODY

(71) Applicant: NGK INSULATORS, LTD., Nagoya (JP)

(72) Inventors: Yunie Izumi, Nisshin (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 393 days.

(21) Appl. No.: 15/071,324

(22) Filed: Mar. 16, 2016

(65) Prior Publication Data

US 2016/0271908 A1    Sep. 22, 2016

(30) Foreign Application Priority Data

Mar. 20, 2015   (JP) .................................. 2015-057672

(51) Int. Cl.
*B22F 7/00* (2006.01)
*B22F 7/04* (2006.01)
(Continued)

(52) U.S. Cl.
CPC .............. *B32B 9/005* (2013.01); *B22F 7/008* (2013.01); *B22F 7/04* (2013.01); *B32B 3/12* (2013.01); *B32B 7/04* (2013.01); *B32B 15/04* (2013.01); *B32B 2255/06* (2013.01); *B32B 2255/20* (2013.01); *B32B 2307/202* (2013.01);
(Continued)

(58) Field of Classification Search
CPC .......... C04B 38/0006; C04B 2235/768; C04B 2235/3213; C04B 34/00; C04B 34/01; C04B 37/001; Y10T 428/24149
See application file for complete search history.

(56) References Cited

U.S. PATENT DOCUMENTS

2002/0149297 A1* 10/2002 Yamamoto ............ H01L 41/083
310/328
2004/0175585 A1   9/2004 Zou et al.
(Continued)

FOREIGN PATENT DOCUMENTS

EP       1 095 914 A2    5/2001
EP       1 325 774 A1    7/2003
(Continued)

OTHER PUBLICATIONS

Extended European Search Report (Application No. 16161134.8) dated Aug. 5, 2016.
(Continued)

*Primary Examiner* — Melissa A Rioja
(74) *Attorney, Agent, or Firm* — Burr & Brown, PLLC

(57) ABSTRACT

A composite body of the present invention includes a base and an oxide layer arranged on the base, the oxide layer containing more than 45% by volume of a perovskite-type oxide phase. The composite body may include a first member, a second member, and a joining portion that joins the first member and the second member, at least one of the first member and the second member serving as the base, and the joining portion serving as the oxide layer. The composite body may include the base and a covering portion that covers the whole or part of a surface of the base, the covering portion being formed of the oxide layer.

15 Claims, 8 Drawing Sheets

(51) Int. Cl.
  *B32B 15/04*    (2006.01)
  *B32B 3/12*     (2006.01)
  *B32B 7/04*     (2019.01)
  *B32B 9/00*     (2006.01)
  *C04B 35/01*    (2006.01)
  *C04B 35/26*    (2006.01)
  *C04B 35/45*    (2006.01)
  *C04B 35/565*   (2006.01)
  *C04B 37/00*    (2006.01)
  *C04B 38/00*    (2006.01)

(52) U.S. Cl.
  CPC ..... *B32B 2307/704* (2013.01); *B32B 2457/00* (2013.01); *C04B 35/01* (2013.01); *C04B 37/001* (2013.01); *C04B 38/0006* (2013.01); *C04B 2235/3213* (2013.01); *C04B 2235/768* (2013.01); *Y10T 428/24149* (2015.01)

(56) References Cited

U.S. PATENT DOCUMENTS

| | | | |
|---|---|---|---|
| 2007/0095653 A1* | 5/2007 | Ohashi | C23C 14/0073 204/192.15 |
| 2008/0129156 A1* | 6/2008 | Kobayashi | H01L 41/0986 310/366 |
| 2008/0198204 A1* | 8/2008 | Ozawa | B41J 2/14274 347/70 |
| 2008/0217382 A1* | 9/2008 | Kim | B23K 35/22 228/177 |
| 2009/0246405 A1 | 10/2009 | Tsuchiya et al. | |
| 2010/0251888 A1* | 10/2010 | Fekety | B01D 53/228 95/54 |
| 2011/0177424 A1 | 7/2011 | Goto | |
| 2012/0062074 A1* | 3/2012 | Hahiro | B41J 2/14233 310/364 |
| 2015/0158016 A1 | 6/2015 | Mori et al. | |
| 2015/0270026 A1* | 9/2015 | Izumi | F01N 3/027 428/116 |

FOREIGN PATENT DOCUMENTS

| | | |
|---|---|---|
| EP | 2 921 466 A1 | 9/2015 |
| JP | 2005-339904 A | 12/2005 |
| JP | 3891790 B | 3/2007 |
| JP | 2011-099405 A | 5/2011 |
| JP | 4874574 B | 2/2012 |
| JP | 2013-030316 A | 2/2013 |
| JP | 2013-105721 A | 5/2013 |
| JP | 2014-062476 A | 4/2014 |

OTHER PUBLICATIONS

Japanese Office Action, Japanese Application No. 2015-057672, dated Aug. 21, 2018 (4 pages).

* cited by examiner

Front View

Plan View

Bottom Plan View

COMPOSITE BODY, HONEYCOMB STRUCTURE, AND METHOD FOR PRODUCING COMPOSITE BODY

BACKGROUND OF THE INVENTION

1. Field of the Invention

The present invention relates to a composite body, honeycomb structure, and a method for producing the composite body.

2. Description of the Related Art

Hitherto, composite bodies including oxide layers with electrical conductivity, for example, joined bodies including joining portions composed of oxide layers with electrical conductivity and covered bodies including a covering portion composed of oxide layers with electrical conductivity, have been desired. As a joining material used for the production of a joined body, for example, a conductive joining material containing a nickel oxide powder, a nickel metal powder, an iron oxide powder, and a vehicle has been reported (see Patent Literature 1). In Patent Literature 1, members are bonded with the conductive joining material and treated at 1000° C. or higher to join the members together. As a covering material for the production of a covered body, for example, a covering material containing a metal, for example, copper or aluminum, and a covering material containing a composite material composed of $MoSi_2$ and at least one of Si and SiC have been reported (Patent Literatures 2 and 3).

As ceramics with electrical conductivity, perovskite-type oxides have been known. As a method for producing a perovskite-type oxide, for example, it is reported that combustion synthesis is performed with a reaction raw material containing a powder of a metal in group 4, a carbonate of an element of group 2, and a sodium perchlorate, and then reaction products are pulverized and washed with water (see Patent Literature 4). In Patent Literature 4, the combustion synthesis is performed under conditions including an adiabatic flame temperature of 1500° C. or higher. The reaction products are a synthesized powder and a by-product (NaCl). By pulverizing the reaction product and then washing the pulverized product with water, the by-product is sufficiently removed. Thus, the perovskite-type ceramic having a nearly theoretical density is obtained by sintering.

CITATION LIST

Patent Literature

PTL 1: Japanese Patent No. 3891790
PTL 2: Japanese Unexamined Patent Application Publication No. 2011-099405
PTL 3: Japanese Unexamined Patent Application Publication No. 2014-062476
PTL 4: Japanese Patent No. 4874574

SUMMARY OF THE INVENTION

In the case where a joined body is produced with a joining material disclosed in Patent Literature 1, however, the electrical conductivity is not good, in some cases. A covered body including a covering portion (oxide layer) in place of the covering portions disclosed in Patent Literatures 2 and 3 has been desired. In the case where a composite body is produced by the method for producing a perovskite-type oxide disclosed in Patent Literature 4, the electrical conductivity is not good, in some cases. It has thus been desired to provide a novel composite body having better electrical conductivity.

The present invention has been accomplished in order to overcome the foregoing problems. It is a main object of the present invention to provide a novel composite body having better electrical conductivity and a method for producing the composite body.

To achieve the foregoing main object, the inventors have conducted intensive studies, have conceived that, for example, a raw material containing a $La(OH)_3$ powder and a Cu powder is arranged and fired on a base (for example, a portion between target members to be joined together or on a surface of a target member to be covered), and have found that in this case, a composite body having better electrical conductivity is produced. The findings have led to the completion of the present invention.

A composite body of the present invention includes:
a base, and
an oxide layer arranged on the base, the oxide layer containing more than 45% by volume of a perovskite-type oxide phase.

A honeycomb structure of the present invention includes the composite body described above.

A method according to the present invention for producing a composite body, the method includes a step of:
firing a laminate including an oxide layer raw material arranged on a base to form an oxide layer on the base, the oxide layer containing more than 45% by volume of a perovskite-type oxide phase.

According to the composite body of the present invention and the method for producing the composite body, it is possible to provide a novel composite body having better electrical conductivity. The reason for this is presumably that, for example, the oxide layer contains more than 45% by volume of the perovskite-type oxide phase; hence, the electrical conductivity is increased.

DETAILED DESCRIPTION OF THE INVENTION

A composite body of the present invention includes a base and an oxide layer arranged on the base, the oxide layer containing more than 45% by volume of a perovskite-type oxide phase. For example, the composite body may be a joined body including a first member, a second member, and a joining portion that joins the first member and the second member, at least one of the first member and the second member serving as the base described above, and the joining portion serving as the oxide layer. For example, the composite body may be a covered body including the base described above and a covering portion that covers the whole or part of a surface of the base, the covering portion serving as the oxide layer described above. Embodiments of the present invention will be described below with reference to the drawings.

First Embodiment

Figure 1:
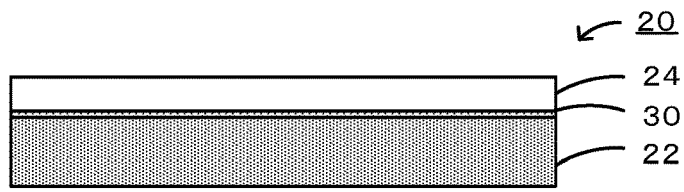
FIG. 1 is an explanatory drawing of an example of a schematic structure of a joined body 20.

FIG. 1 is an explanatory drawing of an example of a schematic structure of a joined body 20 serving as a composite body according to an embodiment of the present invention. As illustrated in FIG. 1, the joined body 20 includes a first member 22, a second member 24, and a joining portion 30 that joins the first member 22 and the second member 24. Each of the first member 22 and the second member 24 may be composed of a porous material or a dense material. The joined body 20 may be a body in which a porous material and a porous material are joined together, a body in which a porous material and a dense material are joined together, or a body in which a dense material and a dense material are joined together. The first member 22 and the second member 24 may be composed of the same or different materials.

Each of the first member 22 and the second member 24 that are targets to be joined together may be composed of a porous ceramic. The porous ceramic is not particularly limited as long as it is a ceramic with a porous structure. The porous structure may have open pores on its surfaces. For example, the porous structure may have a porosity of 10% by volume or more, preferably 20% by volume or more, and more preferably 40% by volume or more. In view of simple production, the porosity is preferably 90% by volume or less. The porosity of the porous ceramic may be appropriately selected, depending on, for example, the application. The porous ceramic preferably has an average pore diameter of, for example, 1 µm or more and 300 µm or less. In this range, the oxide layer contained in the joining portion penetrates easily into the pores in the porous ceramic, thereby resulting in firmer joining. The average pore diameter is preferably 5 µm or more and more preferably 10 µm or more. The average pore diameter is preferably 100 µm or less and more preferably 50 µm or less. The porosity and the average pore diameter of the porous ceramic indicate the results obtained from mercury intrusion porosimetry measurement.

The porous ceramic may be formed so as to contain one or more inorganic materials selected from, for example, carbides, such as silicon carbide, titanium carbide, zirconium carbide, and boron carbide, nitrides; nitrides, such as silicon nitride, aluminum nitride, titanium nitride, and zirconium nitride; oxynitrides, such as SIALON; silicides, such as molybdenum silicide; and zirconium phosphate. The porous ceramic may also be formed so as to contain one or more inorganic materials selected from, for example, cordierite, mullite, zeolite, aluminum titanate, aluminum oxide, zirconium oxide, titanium oxide, silicon oxide, and magnesium oxide. The form of the porous ceramic is not particularly limited and may be selected, depending on the application. Examples of the form include plate forms, cylindrical forms, and honeycomb forms. A form having a structure through which fluid passes may also be used. Specifically, the porous ceramic preferably has a honeycomb structure including a partition portion configured to form a plurality of cells serving as passages of fluid. The porous ceramic may have electrical conductivity. In this case, the porous ceramic is preferably composed of a composite material containing SiC and Si, SiC being bonded with Si, pores being defined by SiC and Si. The Si-bonded SiC ceramic has electrical conductivity. For example, a metal member serving as an electrode can be joined thereto. In such a case, the application of the present invention has significance. The porous ceramic may be composed of a composite material ($Si_3N_4$-bonded SiC) containing SiC and $Si_3N_4$, SiC being bonded with $Si_3N_4$, pores being defined by SiC and $Si_3N_4$.

Each of the first member 22 and the second member 24 that are targets to be joined together may be composed of a dense material. The dense material is not particularly limited as long as it is dense and has low porosity. For example, each of the first member 22 and the second member 24 may be a metal member or may be composed of a dense ceramic. The dense material may have a porosity of, for example, 5% by volume or less, preferably 1% by volume or less, and more preferably 0.5% by volume or less. The metal member is not particularly limited as long as it is composed of a metal, such as a typical metal or a transition metal. For example, a metal member having high electrical conductivity is preferred. Among transition metals, a metal, for example, Fe, Co, Ni, or Cu, or an alloy thereof is preferred. A noble metal, for example, Pt or Au, may be used, depending on the application. The metal member may serve as an electrode. In this case, stainless steel, for example, a Cr—Ni—Fe-based alloy (e.g., SUS304, SUS309, or SUS310) or a Cr—Fe-based alloy (e.g., SUS430), is preferably used. The metal member is preferably composed of an alloy containing at least Fe and Cr and more preferably an alloy at least containing 70% by mass or more and less than 90% by mass Fe and 10% by mass or more and less than 30% by mass Cr. This is because the material is stable and has good electrical conductivity. The metal member may be composed of, for example, a heat resistant alloy. The heat resistant alloy may be an Fe-based heat resistant alloy, for example, a Ni—Co—Fe-based alloy (e.g., Kovar) or a Ni—Fe-based alloy (e.g., Invar), or a Ni-based heat resistant alloy, for example, Inconel (Ni—Cr-based alloy) or Hastelloy (Ni—Fe—Mo-based alloy). The metal member may be composed of a Mn-containing material, for example, SUS304, 309, 310, SUS430, Kovar, or Hastelloy. In this case, Mn is presumed to diffuse continuously in the joining portion to enhance the joinability. The form of the metal member, for example, a plate form, may be appropriately selected, depending on the application. Examples of the dense ceramic include a ceramic obtained by densely sintering any of the foregoing materials exemplified for the porous ceramic; a member produced by filling pores in porous ceramic with, for example, a filler or an impregnating material; and a composite oxide member containing a plurality of metals. A specific example of the filled member is a Si-impregnated SiC sintered body in which pores of porous SiC are filled with metallic Si by impregnation. This material has good thermal conductivity and good electrical conductivity owing to metallic Si. As the composite oxide member, an electrically conductive ceramic material, for example, a $LaCrO_3$-based material, a $BaTiO_3$-based material, a $LaMnO_3$-based material, a $LaCoO_3$-based material, a $NaCo_2O_4$-based material, a $Ca_3Co_4O_9$-based material, a $LaNiO_3$-based material, or a $SrTiO_2$-based material may be used. The term "-based material" is used to indicate that the material includes, for example, a material partially substituted with an alkali metal element, an alkaline-earth metal, or an element different in valence. Specifically, the $LaMnO_3$-based material includes, for example, $(La_{0.9}Sr_{0.1})MnO_3$. These materials may be used as materials for fuel cells (for example, SOFC), thermoelectric elements, sensors, and the like.

Among the foregoing materials, each of the first member 22 and the second member 24 that are targets to be joined together is preferably composed of at least one of the Si-containing ceramics and the Fe-containing alloys. These materials have better joinability to the joining portion 30 containing a perovskite-type oxide phase. As the Si-containing ceramics, for example, SiC, Si-impregnated SiC, $Si_3N_4$, and $Si_3N_4$-bonded SiC are preferred. As the Fe-containing alloys, for example, iron-based alloys, such as stainless steel (SUS), Kovar, and Invar, Inconel, and Hastelloy are preferred. In addition to the Fe-containing alloys, alloys containing, for example, Co, Ni, and Cu, which are transition metals the same as Fe, which are similar in electron configuration to that of Fe, and which have ionic radii close to that of Fe, are also presumed to have good joinability to the joining portion 30 containing a perovskite-type oxide phase.

In the first member 22 and the second member 24, which are targets to be joined together, a difference in thermal expansion coefficient therebetween may be 4.0 ppm/K or more, 5.0 ppm/K or more, or 6.0 ppm/K or more. Even in the case of a joined body in which members having a relatively large difference in thermal expansion coefficient therebetween are joined together, a joining portion composed of an oxide ceramic permits the joining strength and the electrical conductivity to be maintained. In particular, also in the case of a joined body used under repeated heating, the joining strength and the electrical conductivity are maintained. For example, a Cr—Ni—Fe-based alloy (SUS304) has a thermal expansion coefficient of 18 ppm/K. A Cr—Fe-based alloy (SUS430) has a thermal expansion coefficient of 12 ppm/K. A Si-bonded SiC sintered body has a thermal expansion coefficient of 4.5 ppm/K. $LaCrO_3$ has a thermal expansion coefficient of 9.4 ppm/K.

The joining portion 30 is an oxide layer containing more than 45% by volume of a perovskite-type oxide phase and joins the first member 22 and the second member 24. In the joining portion 30, a perovskite-type oxide seemingly contributes to the electrical conductivity to increase the electrical conductivity.

The term "perovskite-type oxide" is a general term that includes an oxide having a perovskite structure represented by the general formula $ABO_3$; and oxides each having a perovskite-related structure in which a perovskite structure and another structure are mixed together. An example of the oxide having a perovskite-related structure is an oxide having a layered perovskite structure. The oxide having a layered perovskite structure may be an oxide having a layered structure which is represented by, for example, the general formula $A_2BO_4$ and in which $ABO_3$ layers each having a perovskite structure and AO layers each having a rock salt structure are alternately stacked in the c-axis direction. In the general formulae $ABO_3$ and $A_2BO_4$, the A sites may be occupied by one or more selected from the group consisting of alkali metals, alkaline-earth metals, and rare-earth metals. In these oxides, a perovskite structure or a perovskite-related structure is easily formed. Specifically, the A sites each may be occupied by, for example, a monovalent cation, e.g., Li, Na, K, or Ag, a divalent cation, e.g., Pb, Ba, Sr, or Ca, or a trivalent cation, e.g., Bi, La, Ce, or Nd. The B sites may be occupied by one or more selected from transition metals. In these oxides, a perovskite structure or a perovskite-related structure is easily formed. Specifically, the B sites each may be occupied by, for example, a monovalent cation, e.g., Li or Cu, a divalent cation, e.g., Mg, Ni, Zn, Co, Sn, Fe, Cd, Cu, or Cr, a trivalent cation, e.g., Mn, Sb, Al, Yb, In, Fe, Co, Sc, Y, or Sn, a tetravalent cation, e.g. Ti or Zr, a pentavalent cation, e.g., Nb, Sb, Ta, or Bi, or a hexavalent cation, e.g., W, Te, or Re. The term "general formula" is used to indicate that a compound represented by each general formula may be stoichiometric or that at least one element in a compound represented by each general formula may be contained in an excessive or deficient amount or may be partially substituted with another element. For example, in an oxide having a perovskite structure, oxygen deficiency is more likely to occur because of, for example, the influence of a synthetic atmosphere; hence, an oxide represented by $ABO_{3-x}$ ($0<x<3$) may be regarded as a perovskite-type oxide.

As the perovskite-type oxide, for example, $La_2CuO_4$, $SrFeO_3$, $La_2NiO_4$, $LaCuO_3$, $LaFeO_3$, $CaFeO_3$, $GdFeO_3$, $SrTiO_3$, $LaNiO_3$, or $(La,Sr)MnO_3$ is preferred. At least one of an oxide containing La and Cu and an oxide containing Sr and Fe is more preferred. At least one of $La_2CuO_4$ and $SrFeO_3$ is still more preferred. The reason for this is that these oxides have good electrical conductivity to lead to the joining portion having higher electrical conductivity.

The joining portion 30 may be composed of a single-phase perovskite-type oxide or a composite phase including, for example, a perovskite-type oxide phase and a metal oxide phase other than a perovskite-type oxide phase. The perovskite-type oxide phase may contain a single kind of perovskite-type oxide or two or more kinds of perovskite-type oxide. The term "single-phase perovskite-type oxide" is used to indicate that a perovskite-type oxide phase may be contained in an amount of 100% by volume and that an oxide phase other than the perovskite-type oxide phase may be contained in an amount of 5% by volume or less, 3% by volume or less, or 1% by volume or less.

The metal oxide contained in the composite phase may be a metal oxide different from the foregoing perovskite-type oxide and may be a simple metal oxide containing a single type of metal or a composite metal oxide containing two or more types of metals. The metal oxide may contain a transition metal. The metal oxide preferably contains one or more selected from Fe, Co, Ni, Mn, Cu, Ti, V, Zr, Nb, Mo, Ta, and W and more preferably contains, for example, Fe, Ni, Mn, and/or Cu. For example, the metal oxide may be one or more of $Fe_2O_3$, NiO, $MnO_2$, and CuO. The metal oxide may have electrical conductivity or may not have electrical conductivity.

The metal oxide contained in the composite phase preferably contains the same metal element as that contained in the perovskite-type oxide and is more preferably a simple metal oxide containing the same metal element as that occupying the B sites of the perovskite-type oxide. Preferred examples of the composite phase include a composite phase containing $La_2CuO_4$ serving as a perovskite-type oxide and CuO serving as a metal oxide; a composite phase containing SrFeO$_3$ serving as a perovskite-type oxide and Fe$_2$O$_3$ serving as a metal oxide; a composite phase containing La$_2$NiO$_4$ serving as a perovskite-type oxide and NiO serving as a metal oxide; a composite phase containing SrTiO$_3$ serving as a perovskite-type oxide and TiO$_2$ serving as a metal oxide; and a composite phase containing (La,Sr)MnO$_3$ serving as a perovskite-type oxide and MnO$_2$ serving as a metal oxide. Of these, the composite phase containing La$_2$CuO$_4$ serving as a perovskite-type oxide and CuO serving as a metal oxide and the composite phase containing SrFeO$_3$ serving as a perovskite-type oxide and Fe$_2$O$_3$ serving as a metal oxide are more preferred. These composite phases result in better electrical conductivity and joinability.

The joining portion 30 may contain more than 45% by volume of the perovskite-type oxide phase, preferably contains 70% by volume or more, more preferably 90% by volume or more, and still more preferably 97% by volume or more of the perovskite-type oxide phase. In the case where the perovskite-type oxide is contained in an amount more than 45% by volume, the electrical conductivity is increased. The joining portion 30 may contain less than 55% by volume of the metal oxide, preferably contains 30% by volume or less, more preferably 10% by volume or less, and still more preferably 3% by volume or less of the metal oxide. In the case where the metal oxide is contained, the joinability of the base and the oxide layer is enhanced. In the case where the metal oxide is contained in an amount less than 55% by volume, the amount of the perovskite-type oxide is not too small, thus inhibiting a decrease in electrical conductivity.

The joining portion 30 preferably has a porosity of 90% by volume or less, more preferably 50% by volume or less, and still more preferably 30% by volume or less. The joining portion 30 is more preferably composed of a dense material in view of the electrical conductivity and the joining strength. The joining portion 30 preferably has a porosity of 5% by volume or more, more preferably 10% by volume or more, and still more preferably 20% by volume or more. The joining portion 30 more preferably has pores in view of stress relaxation. A method for calculating the porosity of the joining portion will be described. A microstructure image captured with a SEM is subjected to image analysis using image analysis software to determine the porosity of the joining portion. A portion having an area of $0.5 \times 10^{-6}$ m$^2$ of the joining portion is randomly selected and binarized to distinguish between images of pores and the oxide layer. Conditions of the binarization are appropriately set, depending on the resulting image. For example, values obtained empirically are used. In the binarized image, the pores and the oxide layer are separated, and the area ratio thereof is calculated to determine the porosity. The area ratio in a cross section is assumed to be almost equivalent to the volume ratio, and thus the porosity (% by volume) is obtained.

In the case where at least one of the first member 22 and the second member 24 is composed of a porous material, the joining portion 30 may penetrate into pores of the porous material. The joining portion 30 having a structure that penetrates into the pores of the porous material is preferred because the joining strength is further increased.

The joining portion 30 preferably has an electrical conductivity of 0.1 S/cm or more, more preferably 1 S/cm or more, and still more preferably 10 S/cm or more. The joining portion having higher electrical conductivity has superior electrical conductivity, thus leading to efficient use of electricity. The upper limit of the electrical conductivity will be about $1.0 \times 10^{-5}$ S/cm in consideration of the material composition. The electrical conductivity is measured by a two-terminal method using a measurement sample in which electrodes are baked on the joining portion 30 of the joined body 20.

In the joined body 20, the joining strength between the first member 22 and the second member 24 is preferably 1.5 MPa or more. The joining strength is measured by a tensile test (complying with JIS R 1606). The joining strength is more preferably 3.0 MPa or more and still more preferably 5.0 MPa or more. Higher joining strength results in firmer joining to increase the reliability and thus is preferred. The adhesion strength between the first member 22 and the joining portion 30 and the adhesion strength between the second member 24 and the joining portion 30 are presumed to be at least equal to or higher than the joining strength between the first member 22 and the second member 24.

Figure 2:
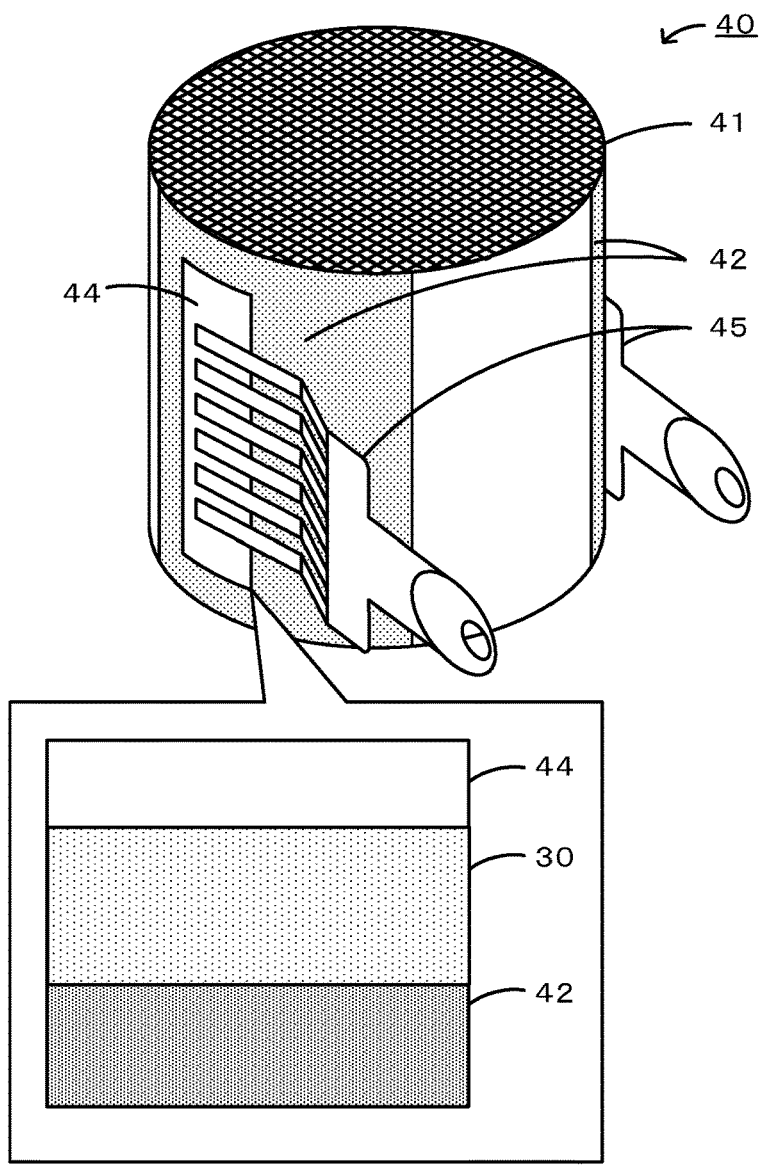
FIG. 2 is an explanatory drawing illustrating a honeycomb structure 40 which is an example of the joined body 20.

The joined body according to this embodiment is not particularly limited as long as it has a structure in which the first member and the second member are joined together. For example, the joined body may be used for, for example, honeycomb structures, thermoelectric elements, ceramic heaters, gas sensors for the detection of oxygen, NOx, and other gases, and fuel cells. For example, in the case of a honeycomb structure, the joined body may be preferably used to heat the honeycomb structure by the application of a voltage to the metal member. FIG. 2 is an explanatory drawing illustrating a honeycomb structure 40 which is an example of the joined body 20 and which is a honeycomb structure according to an embodiment of the present invention. The honeycomb structure 40 is configured to apply a voltage to electrode terminals 45 to heat a honeycomb base 41. The honeycomb structure 40 includes the honeycomb base 41; highly electrically conductive porous portions 42 having higher electrical conductivity than that of the honeycomb base 41, each of the highly electrically conductive porous portions 42 corresponding to the first member 22 (or the second member 24); metal electrodes 44 joined to the highly electrically conductive porous portions 42, each of the metal electrodes 44 corresponding to the second member 24 (or the first member 22); and the electrode terminals 45 connected to the metal electrodes 44. As with the joined body 20 illustrated in FIG. 1, the joining portion 30 is composed of an oxide layer containing more than 45% by volume of a perovskite-type oxide phase and joins the highly electrically conductive porous portions 42 and the metal electrodes 44. A difference in electrical conductivity between the honeycomb base 41 and the highly electrically conductive porous portions 42 may be attributed to a difference in metal content therebetween. For example, in the case where the honeycomb structure is composed of a Si-bonded SiC ceramic, the highly electrically conductive porous portions 42 may have a higher Si content.

A method for producing a joined body according to this embodiment will be described below. The method for producing a joined body according to this embodiment may include, for example, (A) a base formation step of forming a first member and a second member and (B) a joining step of forming a joining portion (composed of the foregoing oxide layer) between the first member and the second member to join the first member and the second member. In the case where the first member and the second member are separately prepared, the base formation step (A) may be omitted.

(A) Base Formation Step

In this step, the base is formed. For example, in the case where the first member and the second member are composed of a porous ceramic or a dense ceramic, the base may be formed by mixing raw materials together, molding the resulting mixture by a predetermined molding method, and firing the resulting molded article. The porous ceramic may be formed so as to contain one or more inorganic materials selected from, for example, carbides, such as silicon carbide, titanium carbide, zirconium carbide, and boron carbide, nitrides, such as silicon nitride, aluminum nitride, titanium nitride, and zirconium nitride, oxynitrides, such as SIALON, silicides, such as molybdenum silicide, and zirconium phosphate. The porous ceramic may be formed so as to contain one or more inorganic materials selected from, for example, cordierite, mullite, zeolite, aluminum titanate, aluminum oxide, zirconium oxide, titanium oxide, silicon oxide, and magnesium oxide. In this step, for example, an inorganic material serving as an aggregate, a pore-forming material, and a dispersion medium are mixed to prepare a clay body or a slurry. In this case, a raw material composition is preferably adjusted in such a manner that the porosity and the average pore diameter of the porous ceramic are in the ranges described above, specifically, for example, the porous ceramic has a porosity of 10% by volume or more and an average pore diameter of 1 or more and 300 μm or less. In this step, a treatment for filling pores of the porous ceramic with an impregnating material by impregnation may be performed to form the first member and the second member. The impregnation treatment may be performed by, for example, forming an impregnating base on the porous ceramic and performing heating at a temperature at which the impregnating base is melted. In the case where the porous ceramic is formed of a Si-bonded SiC sintered body, the impregnating material may be metallic Si.

In this step, in the case where the first member and the second member are metallic members, each of the members may be processed into a predetermined form. The metal members are not particularly limited as long as they are composed of a metal, for example, a typical metal or a transition metal. For example, a highly electrically conductive metal is preferred. Among transition metals, a metal, for example, Fe, Co, Ni, or Cu, or an alloy thereof is preferred. A noble metal, for example, Pt or Au, may be used, depending on the application. The metal members may be processed into, for example, a plate form.

A difference in thermal expansion coefficient between the first member and the second member formed in this step may be 6 ppm/K or more. Even in the case of a joined body in which members having a relatively large difference in thermal expansion coefficient therebetween are joined together, a joining portion composed of an oxide ceramic permits the joining strength and the electrical conductivity to be maintained. In particular, also in the case of a joined body used under repeated heating, the joining strength and the electrical conductivity are maintained.

Regarding the base formation step, for example, the case where a Si-bonded SiC ceramic (composite material) is formed as the porous ceramic will be specifically described. In this case, for example, a plastic clay body may be formed by mixing a SiC powder and a Si powder together in a predetermined volume ratio, adding a dispersion medium, such as water, a pore-forming material, an organic binder, and so forth thereto, and kneading the mixture. As the pore-forming material, a material to be burned off during firing is preferred. For example, starch, coke, or a foaming resin may be used. As the binder, for example, an organic binder, such as a cellulose-based material, is preferably used. As a dispersant, a surfactant, such as ethylene glycol, may be used. For example, the porous ceramic may be formed into a honeycomb formed article having a freely-selected form as described above by extrusion molding with a mold including cells juxtaposed. The resulting honeycomb formed article is preferably subjected to drying treatment, calcination treatment, and firing treatment. The calcination treatment is a treatment in which an organic component contained in the honeycomb formed article is removed by combustion at a temperature lower than a firing temperature. The firing temperature may be 1400° C. or higher and 1500° C. or lower and preferably 1430° C. or higher and 1450° C. or lower. A firing atmosphere is not particularly limited. An inert atmosphere is preferred. An Ar atmosphere is more preferred. The honeycomb base (Si-bonded SiC ceramic) sintered body can be obtained through the step described above.

(B) Joining Step

In this step, a joining treatment for joining the first member and the second member with the joining portion is performed. The first member and the second member may be freely selected from the foregoing members. The joining step may include, for example, (B-1) a laminate production substep of arranging a joining portion raw material between the first member and the second member to produce a laminate, and (B-2) a firing substep of firing the laminate. In the case where the laminate including the joining portion raw material arranged between the first member and the second member is separately prepared, the laminate production substep (B-1) may be omitted.

(B-1) Laminate Production Substep

In this substep, the joining portion raw material is arranged between the first member and the second member to produce the laminate. The joining portion raw material contains a raw material (oxide layer raw material) for an oxide layer containing more than 45% by volume of a perovskite-type oxide phase. The oxide layer raw material may contain a perovskite-type oxide itself, may contain one or more of a metal (an elemental metal or an alloy) containing a metal contained in the perovskite-type oxide and a compound containing a metal contained in the perovskite-type oxide, or may contain both of them. Of these, more preferably, a metal powder and a compound powder are contained. In the following firing substep, the synthesis of a perovskite-type oxide and the joining of the first member and the second member with the oxide layer containing the perovskite-type oxide can be simultaneously performed, thereby reducing the process cost.

The compound powder preferably contains one or more selected from the group consisting of oxide powders, carbonate powders, hydroxide powders, and chloride powders. The reason for this is that these compound powders react mildly with a metal powder, compared with nitrates and sulfates, thus resulting in good workability. Among those described above, a hydroxide powder and a carbonate powder are more preferred. The reason for this is as follow: Raw materials for these compound powders are stably available at low cost. These compound powders react with a metal powder more mildly, thus resulting in better workability. The compound powder is a powder of a compound containing a metal element contained in the oxide layer of the joined body described above. The compound powder may be composed of a simple metal compound containing a single type of metal element or may be composed of a composite metal compound containing two or more types of metal elements. The metal element contained in the compound powder may be any one of metal elements contained in the oxide layer of the joined body described above. Among those metal elements, a metal element contained in the perovskite-type oxide is preferred. A metal element occupying the A sites of the perovskite-type oxide is more preferred. As the compound powder, for example, $La_2O_3$, $SrCO_3$, $La(OH)_3$, $CaCO_3$, $CaCl_2$, $Gd(OH)_3$, or $GdCl_2$ is preferred. $La(OH)_3$ or $SrCO_3$ is more preferred. As the compound powder, a powder of the perovskite-type oxide contained in the oxide layer of the joined body described above may also be used. In this case, however, a step of synthesizing the perovskite-type oxide is needed, thus reducing the production efficiency. As the compound powder, a powder of a metal oxide other than the perovskite-type oxide contained in the oxide layer of the joined body described above may be used. The compound powder preferably has an average particle diameter of, for example, 0.05 µm or more and 50 µm or less. In this range, an appropriate joining strength is easily obtained. The average particle diameter is preferably 0.1 µm or more and more preferably 0.5 µm or more. Furthermore, the average particle diameter is preferably 30 µm or less and more preferably 15 µm or less. The average particle diameter of a powder of the oxide layer raw material indicates a median diameter (D50) measured with a laser diffraction/scattering particle size distribution analyzer using water as a dispersion medium.

The metal powder is a powder of a metal containing a metal element contained in the oxide layer of the joined body described above. The metal powder may be composed of a simple metal containing a single type of metal element or may be composed of an alloy containing two or more types of metal elements. The metal element contained in the metal powder may be any one of metal elements contained in the oxide layer of the joined body described above. Of these, the metal element contained in the metal powder is more preferably a metal element occupying the B sites of the perovskite-type oxide. As the metal element, for example, Cu, Fe, Ni, Mn, or Ti is preferred. Cu or Fe is more preferred. The metal powder preferably has an average particle diameter of, for example, 1 µm or more and 40 µm or less. In this range, an appropriate joining strength is easily obtained. An average particle diameter of 1 µm or more results in ease of handling because the reactivity is not too high. The average particle diameter is more preferably 3 µm or more. The average particle diameter is preferably 30 µm or less and more preferably 10 µm or less.

Preferred examples of the oxide layer raw material include a material containing a compound powder composed of $La(OH)_3$ and a metal powder composed of Cu; a material containing a compound powder composed of $SrCO_3$ and a metal powder composed of Fe; a material containing a compound powder composed of $La_2O_3$ and a metal powder composed of Ni; a material containing a compound powder composed of $CaCO_3$ and a metal powder composed of Fe; and a material containing a compound powder composed of $La(OH)_3$ and $SrCl_2$ and a metal powder composed of Mn. Of these, the material containing a compound powder composed of $La(OH)_3$ and a metal powder composed of Cu, and the material containing a compound powder composed of $SrCO_3$ and a metal powder composed of Fe are more preferred. In the case where an oxide layer raw material powder containing $La(OH)_3$ and Cu is used, a joined body including a joining portion that contains $La_2CuO_4$ serving as a perovskite-type oxide can be produced. In the case where an oxide layer raw material powder containing $SrCO_3$ and Fe is used, a joined body including a joining portion that contains $SrFeO_3$ serving as a perovskite-type oxide can be produced.

The oxide layer raw material may contain more than 50% by mass and 95% by mass or less of the compound powder and preferably contains 60% by mass or more and more preferably 70% by mass or more of the compound powder. The oxide layer raw material preferably contains 80% by mass or less of the compound powder. The oxide layer raw material may contain 5% by mass or more and less than 50% by mass of the metal powder and preferably contains 15% by mass or more and more preferably 20% by mass or more of the metal powder. The oxide layer raw material preferably contains 50% by mass or less and more preferably 40% by mass or less of the metal powder.

The joining portion raw material may contain, for example, a binder, a solvent, a dispersant, and a plasticizer, in addition to the oxide layer raw material, and may be formed into, for example, a slurry-, paste-, or clay-like material. As the binder, for example, polyvinyl butyral (PVB) may be preferably used. As the solvent, for example, terpineol may be preferably used.

A method for arranging the joining portion raw material between the first member and the second member to produce the laminate is not particularly limited. For example, the laminate may be formed by applying a slurry or paste containing the oxide layer raw material powder to one or both of the first member and the second member by an application method and then laminating the first member and the second member so as to sandwich a surface to which the slurry or paste has been applied. In this case, high adhesion of the first member and the second member to the joining portion is provided. Thus, for example, peeling at the joining portion is inhibited. The laminate may be formed by forming a molded article using, for example, an extrusion molding method with a clay-like material containing the oxide layer raw material powder and arranging the molded article between the first member and the second member. The laminate may be formed by arranging the oxide layer raw material powder alone between the first member and the second member and limiting the movement of the oxide layer raw material powder with a frame or the like.

(B-2) Firing Substep

In this substep, the laminate is fired. In this substep, in the case where the oxide layer raw material contains the perovskite-type oxide, the perovskite-type oxide is sintered to form the perovskite-type oxide phase. In the case where the oxide layer raw material contains one or more of a metal and a compound thereof, the metal containing a metal contained in the perovskite-type oxide, they are oxidized alone or in combination to form the perovskite-type oxide phase.

In this substep, the firing atmosphere may be an oxidizing atmosphere, for example, atmospheric air or an oxygen atmosphere, or an inert atmosphere, for example, a nitrogen atmosphere or an argon atmosphere. In this substep, the firing temperature may be set in a suitable range, depending on the materials of the first member, the second member, and the joining portion. The firing temperature may be 400° C. or higher and 1200° C. or lower. At 400° C. or higher, the perovskite-type oxide is more reliably synthesized. At 1200° C. or lower, for example, changes in the properties of the first member and the second member during firing can be further inhibited. The firing temperature is preferably 500° C. or higher, more preferably 600° C. or higher, and still more preferably 700° C. or higher. The upper limit of the firing temperature is preferably 1200° C. or lower when the firing atmosphere is an inert atmosphere. The upper limit of the firing temperature is preferably 900° C. or lower when the firing atmosphere is an oxidizing atmosphere. The firing time is preferably 0.1 hours or more and more preferably 0.5 hours or more. The firing time is preferably 24 hours or less, more preferably 10 hours or less, and still more preferably 2 hours or less.

In the joined body of this embodiment and the method for producing the joined body described above, it is possible to provide a novel joined body with good electrical conductivity because the joining portion contains more than 45% by volume of the perovskite-type oxide phase that increases the electrical conductivity. In addition, for example, the oxide layer contained in the joining portion is composed of the oxide ceramic; hence, even if the joining portion is exposed to high temperature in air or the like, changes in material quality and characteristics are less likely to occur. Furthermore, for example, the joining portion has electrical conductivity; hence, for example, when the first member and the second member each having electrical conductivity are used, the first member and the second member can be joined together in such a manner that a current can pass therethrough.

Second Embodiment

Figure 3:
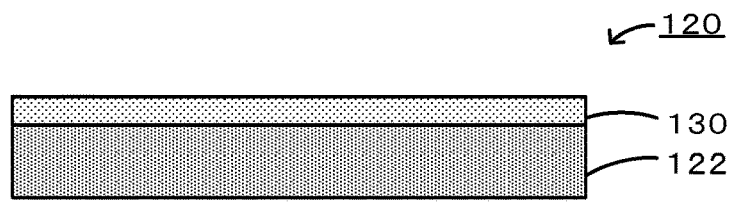
FIG. 3 is an explanatory drawing illustrating a schematic structure of a covered body 120.

FIG. 3 is an explanatory drawing illustrating a schematic structure of a covered body 120 serving as a composite body according to an embodiment of the present invention. As illustrated in FIG. 3, the covered body 120 includes a base 122 and a covering portion 130 that covers a surface of the base 122. The base 122 may be composed of a porous material or dense material. As the base 122 that is a target covered, for example, the foregoing members exemplified as the first member 22 and the second member 24 may be used.

The covering portion 130 is an oxide layer containing more than 45% by volume of a perovskite-type oxide phase and covers the whole or part of a surface of the base 122. In the covering portion 130, the perovskite-type oxide seemingly contributes to the electrical conductivity to increase the electrical conductivity. The covering portion 130 may be the same as the joining portion 30, except that the covering portion 130 covers the surface of the base 122 in place of the joining of the first member 22 and the second member 24. In the case where the base 122 is composed of a porous material, the covering portion 130 may penetrate into pores of the porous material. The covering portion 130 having a structure that penetrates into the pores of the porous material is preferred because the adhesion strength between the base 122 and the covering portion 130 is further enhanced.

In the covered body 120, the adhesion strength between the base 122 and the covering portion 130 is preferably 1.5 MPa or more. The adhesion strength is measured by a tensile test (complying with JIS R 1606). The adhesion strength is more preferably 3.0 MPa or more and still more preferably 5.0 MPa or more. Higher adhesion strength results in firmer adhesion to increase the reliability and thus is preferred.

Figure 4:
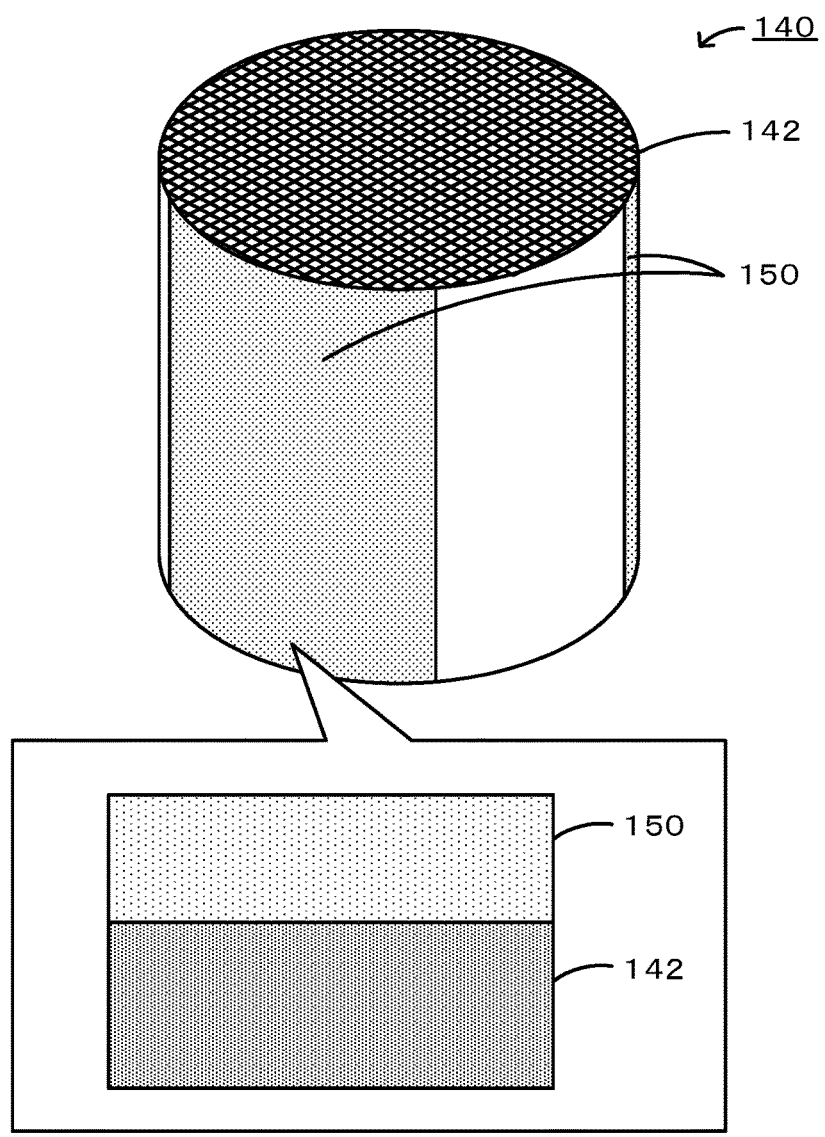
FIG. 4 is an explanatory drawing illustrating a honeycomb structure 140 which is an example of the covered body 120.

The covered body according to this embodiment is not particularly limited as long as it has a structure in which a surface of the base is covered with the covering portion. For example, the covered body may be used for, for example, honeycomb structures, thermoelectric elements, ceramic heaters, gas sensors for the detection of oxygen, NOx, and other gases, and fuel cells. For example, in the case of a honeycomb structure, the covered body may be preferably used to heat the honeycomb structure by the application of a voltage to electrodes. FIG. 4 is an explanatory drawing illustrating a honeycomb structure 140 which is an example of the covered body 120 and which is a honeycomb structure according to an embodiment of the present invention. The honeycomb structure 140 includes a honeycomb base 142 corresponding to the base 122 and electrode portions 150 each corresponding to the covering portion 130 and is configured to apply a voltage to the electrode portions 150 to heat the honeycomb base 142. A voltage may be applied to the electrode portions 150 through, for example, electrode terminals (not illustrated). Each of the electrode portions 150 is formed of the oxide layer containing more than 45% by volume of the perovskite-type oxide phase.

A method for producing a covered body according to this embodiment will be described below. The method for producing a covered body according to this embodiment may include, for example, (A) a base formation step of forming a base and (B) a covering step of forming a covering portion (the oxide layer described above) on the base to cover the base. In the case where the base is separately prepared, the base formation step (A) may be omitted.

(A) Base Formation Step

In this step, the base is formed. This base formation step may be the same step as that of the base formation step according to the foregoing first embodiment.

(B) Covering Step

In this step, a covering treatment for covering the base with the covering portion is performed. As the base, any one of the foregoing members may be used. The covering step may include, for example, (B-1) a laminate production substep of arranging a covering portion raw material on the whole or part of a surface of the base to produce a laminate, and (B-2) a firing substep of firing the laminate. In the case where the laminate including the covering portion raw material arranged on the surface of the base is separately prepared, the laminate production substep (B-1) may be omitted.

(B-1) Laminate Production Substep

In this substep, the covering portion raw material is arranged on the surface of the base to produce the laminate. The covering portion raw material contains a raw material for an oxide layer containing more than 45% by volume of a perovskite-type oxide phase (oxide layer raw material). The covering portion raw material may be the same as the joining portion raw material described in the laminate production substep according to the first embodiment.

A method for arranging the covering portion raw material on the surface of the base to produce the laminate is not particularly limited. For example, the laminate may be formed by applying a slurry or paste containing the oxide layer raw material powder to the surface of the base by an application method. In this case, high adhesion of the base and the covering portion is provided. Thus, for example, peeling of the covering portion is inhibited. The laminate may be formed by forming a molded article using, for example, an extrusion molding method with a clay-like material containing the oxide layer raw material powder and arranging the molded article on the surface of the base. The laminate may be formed by arranging the oxide layer raw material powder alone on the surface of the base and limiting the movement of the oxide layer raw material powder with a frame or the like.

(B-2) Firing Substep

In this substep, the laminate is fired in an oxidizing atmosphere. In this firing substep, firing conditions, such as the firing temperature, the firing time, and the firing atmosphere, are set in a suitable range, depending on the material of the covering portion. For example, the firing conditions may be set as those described in the first embodiment.

In the covered body of this embodiment and the method for producing the covered body described above, it is possible to provide a novel covered body with good electrical conductivity because the covering portion contains more than 45% by volume of the perovskite-type oxide phase that increases the electrical conductivity. In addition, for example, the oxide layer contained in the covering portion is composed of an oxide ceramic; hence, even if the covering portion is exposed to high temperature in air or the like, changes in material quality and characteristics are less likely to occur. Furthermore, for example, the covering portion has electrical conductivity; hence, for example, when the base having electrical conductivity is used, the base enables a current to pass therethrough with the covering portion.

The present invention is not limited to the foregoing embodiments. It should be appreciated that the present invention can be implemented in various ways without departing from the technical scope of the present invention.

Figure 5:
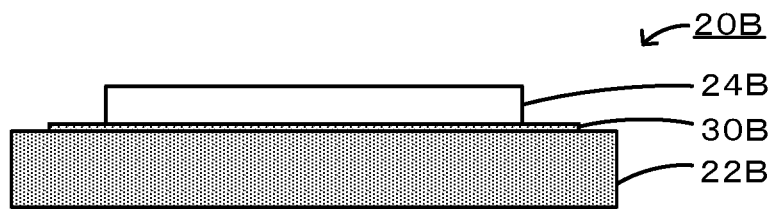
FIG. 5 is an explanatory drawing illustrating a schematic structure of a joined body 20B.
Figure 6:
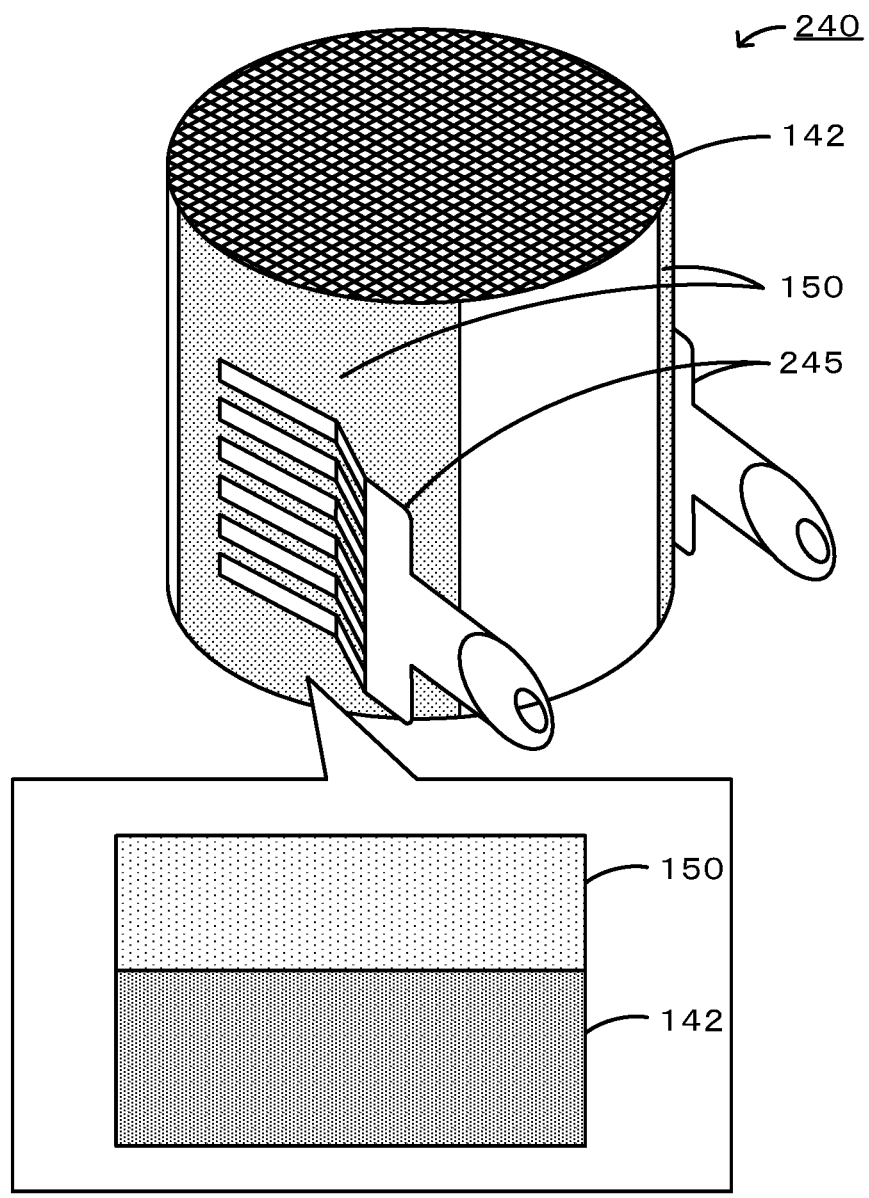
FIG. 6 is an explanatory drawing illustrating a honeycomb structure 240 which is an example of the joined body 20.

For example, in FIGS. 1 and 2, the joined body in which the first member and the joining portion are not exposed has been mainly described. Part of the first member may be exposed. Part of the second member may be exposed. Part of the joining portion (at least one of part of a surface of the joining portion adjacent to the first member and part of a surface of the joining portion adjacent to the second member) may be exposed. Two or more of these parts may be exposed. For example, as illustrated in FIG. 5, a joined body 20B may be provided, the joined body 20B including a first member 22B, a second member 24B joined to part of the first member 22B, and a joining portion 30B joining the first member 22B and the second member 24B. In the joined body 20B, part of a surface of the first member 22B adjacent to the joining portion 30B is exposed. Part of a surface of the joining portion 30B adjacent to the second member 24B is exposed. In this case, a portion of the joining portion 30B whose surface is exposed corresponds to the covering portion in the second embodiment. In other words, the joined body 20B is a composite body including both of the joined body with the joining portion and the covered body with the covering portion. FIG. 6 is an explanatory drawing illustrating a honeycomb structure 240 which is an example of the composite body and which is a honeycomb structure according to an embodiment of the present invention. The honeycomb structure 240 has the same structure as that of the honeycomb structure 140 illustrated in FIG. 4, except that the honeycomb structure 240 includes electrode terminals 245 and that the honeycomb base 142 is joined to the electrode terminals 245 with parts (joining portions) of the electrode portions 150. The area of the second member may be larger, smaller, or equal to that of the joining portion, and is preferably smaller than that of the joining portion.

Figure 7:
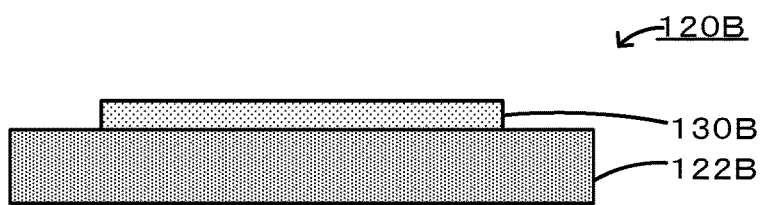
FIG. 7 is an explanatory drawing illustrating a schematic structure of a covered body 120B.

For example, in FIG. 3, the covered body in which the covering portion is arranged on the whole of the surface of the base has been mainly described. The covering portion may be arranged on part of the surface of the base. For example, as illustrated in FIG. 7, a covered body 120B may be provided, the covered body 120B including a base 122B and a covering portion 130B arranged on part of a surface of the base.

For example, in the embodiment described above, the composite body in which the oxide layer is arranged on a surface of the base has been mainly described. A composite body in which oxide layers are arranged on a plurality of surfaces of a base may be provided. A composite body in which oxide layers are arranged on all surfaces of a base may be provided.

For example, in the foregoing embodiments, the honeycomb structures 40, 140, and 240 have been described. A honeycomb structure of the present invention is not limited to these structures and may include the foregoing composite body (joined body or covered body). Specifically, a honeycomb structure in which a honeycomb base having a honeycomb structure is provided as a base and in which electrode portions formed of oxide layers are provided on the honeycomb base (for example, the honeycomb structure 140 or 240) is preferred. In the case where such a honeycomb structure is used as, for example, an electrical heating catalyst carrier (EHC) in which a current passes through electrode portions, the electrode portions including predetermined oxide layers are present; hence, the occurrence of the nonuniform distribution of heat generated is inhibited to uniformly perform heating, thereby leading to good durability. The reason for this is presumably that the perovskite-type oxide of the electrode portions is a material stable at a high temperature of 1000° C. or higher in air, exhibits only a small change in resistance, and inhibits the occurrence of the locally nonuniform distribution of heat generated. As described in Patent Literatures 3 and 4, in the case where a metal or $MoSi_2$ is used for electrode portions, oxidation may proceed from about 400° C. to cause a change in resistance, thereby leading to the occurrence of the locally nonuniform distribution of heat generated.

Examples of the specific production of a composite body (joined body) of the present invention will be described below as experimental examples. Experimental examples 1 to 9 correspond to the examples of the present invention. Experimental example 10 and 11 correspond to a comparative example. It should be appreciated that the present invention is not limited to the following examples and can be implemented in numerous ways without departing from the technical scope of the present invention.

EXAMPLES (Production of Joined Body)

Experimental Examples 1 to 5

In Experimental examples 1 to 5, joined bodies each including an oxide layer containing a $La_2CuO_4$ phase serving as a perovskite-type oxide phase were produced. Specifically, a Cu powder (14.3% by mass) and a $La(OH)_3$ powder (85.7% by mass) were mixed together to prepare an oxide layer raw material powder. Then, α-terpineol serving as a solvent and polyvinyl butyral (PVB) serving as a binder were added thereto. These materials were mixed together to prepare a paste. The resulting paste was defoamed with a planetary centrifugal mixer and then applied to a member (metal member) composed of stainless steel (SUS) (Cr—Fe-based alloy, SUS430) by printing. A member composed of Si-bonded SiC (porous ceramic) was arranged thereon to form a laminate. The laminate was dried in air at 80° C. for 4 hours while being pressed with an alumina plate arranged on the Si-bonded SiC member. The dry laminate was fired in air at 750° C. for an hour to produce a joined body of Experimental example 1.

A joined body of Experimental example 2 was produced as in Experimental example 1, except that the firing temperature was changed to 800° C. A joined body of Experimental example 3 was produced as in Experimental example 1, except that the firing atmosphere was changed to Ar and that the firing temperature was changed to 1000° C. A joined body of Experimental example 4 was produced as in Experimental example 2, except that the oxide layer raw material powder was changed to a $La_2CuO_4$ powder and that the firing atmosphere was changed to Ar. A joined body of Experimental example 5 was produced as in Experimental example 4, except that the firing temperature was changed to 900° C. The $La_2CuO_4$ powder used in Experimental examples 4 and 5 was synthesized as described below. La$_2$O$_3$ and CuO were weighed in such a manner that a desired composition was obtained. Mixing was performed for 4 hours by ball milling with IPA serving as a solvent and iron-core nylon balls serving as grinding media to prepare a slurry. The slurry was dried in a nitrogen atmosphere at 110° C. for 14 hours to prepare a mixed powder. The mixed powder was calcined in air at 1000° C. and then subjected to ball milling for 16 hours with IPA serving as a solvent and ZrO$_2$ balls serving as grinding media. The resulting slurry was dried in the same way as described above to prepare the La$_2$CuO$_4$ powder.

Experimental Examples 6 and 7

In Experimental examples 6 and 7, joined bodies including oxide layers containing a La$_2$CuO$_4$ phase in different proportions were produced. Specifically, a joined body of Experimental example 6 was produced as in Experimental example 1, except that proportions of the Cu powder and the La(OH)$_3$ powder were 22.7% by mass and 77.3% by mass, respectively. A joined body of Experimental example 7 was produced as in Experimental example 1, except that proportions of the Cu powder and the La(OH)$_3$ powder were 36.6% by mass and 63.4% by mass, respectively.

Experimental Examples 8 and 9

In Experimental examples 8 and 9, joined bodies each including an oxide layer containing a SrFeO$_3$ phase serving as a perovskite-type oxide phase were produced. Specifically, a joined body of Experimental example 8 was produced as in Experimental example 1, except that an Fe powder (27.4% by mass) and a SrCO$_3$ powder (72.6% by mass) were mixed together to prepare an oxide layer raw material powder. A joined body of Experimental example 9 was produced as in Experimental example 8, except that the oxide layer raw material powder was changed to a SrFeO$_3$ powder, the firing atmosphere was changed to Ar, and the firing temperature was changed to 900° C. The SrFeO$_3$ powder used in Experimental example 9 was synthesized as described below. Fe$_2$O$_3$ and SrCO$_3$ were weighed in such a manner that a desired composition was obtained. Mixing was performed for 4 hours by ball milling with IPA serving as a solvent and iron-core nylon balls serving as grinding media to prepare a slurry. The slurry was dried in a nitrogen atmosphere at 110° C. for 14 hours to prepare a mixed powder. The mixed powder was calcined in air at 1200° C. and then subjected to ball milling for 16 hours with IPA serving as a solvent and ZrO$_2$ balls serving as grinding media. The resulting slurry was dried in the same way as described above to prepare the SrFeO$_3$ powder.

Experimental Examples 10 and 11

In Experimental examples 10 and 11, joined bodies each including an oxide layer that did not contain a perovskite-type oxide phase were produced. Specifically, a joined body of Experimental example 10 was produced as in Experimental example 1, except that an Fe powder (98.9% by mass) and a TiO$_2$ powder (1.1% by mass) were mixed together to prepare an oxide layer raw material powder. A joined body of Experimental example 11 was produced as in Experimental example 2, except that an Fe powder (69.3% by mass) and ZnO (30.7% by mass) were mixed to prepare an oxide layer raw material powder.

(Identification of Crystal Phase of Joining Portion)

Figure 8:
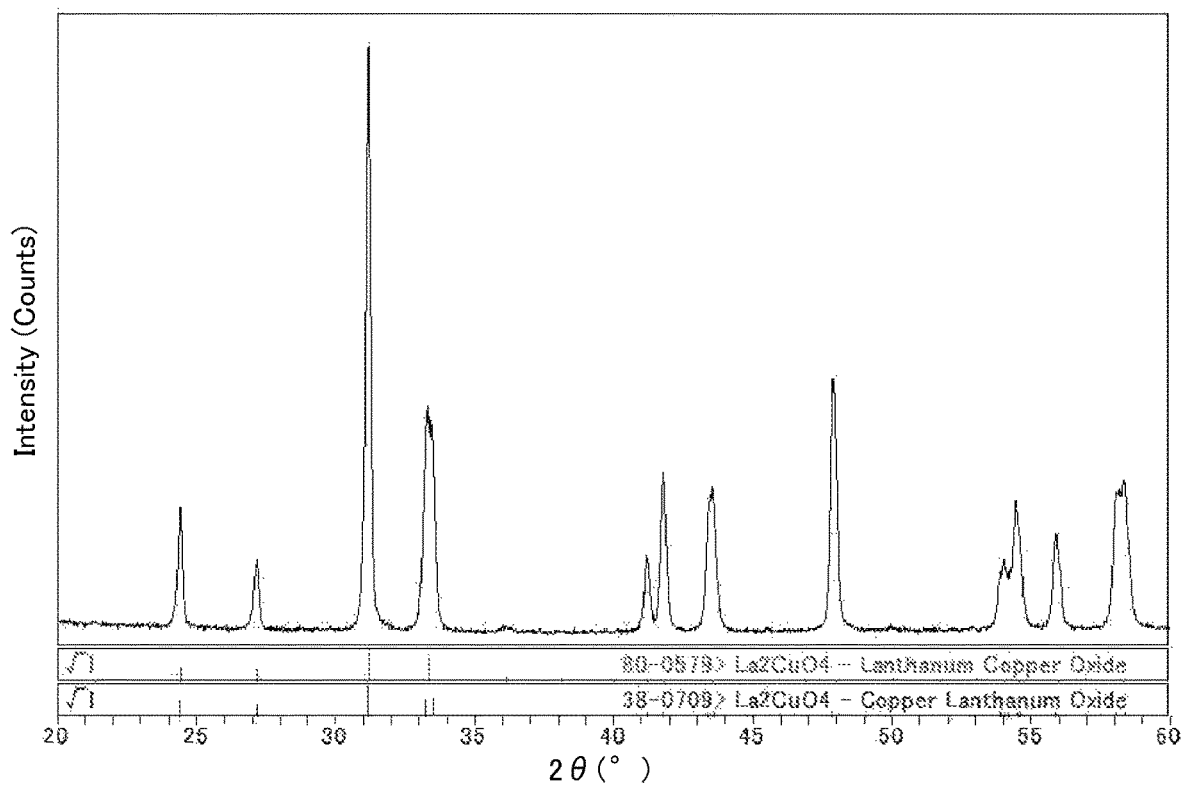
FIG. 8 illustrates an X-ray diffraction pattern of Experimental example 1.
Figure 9:
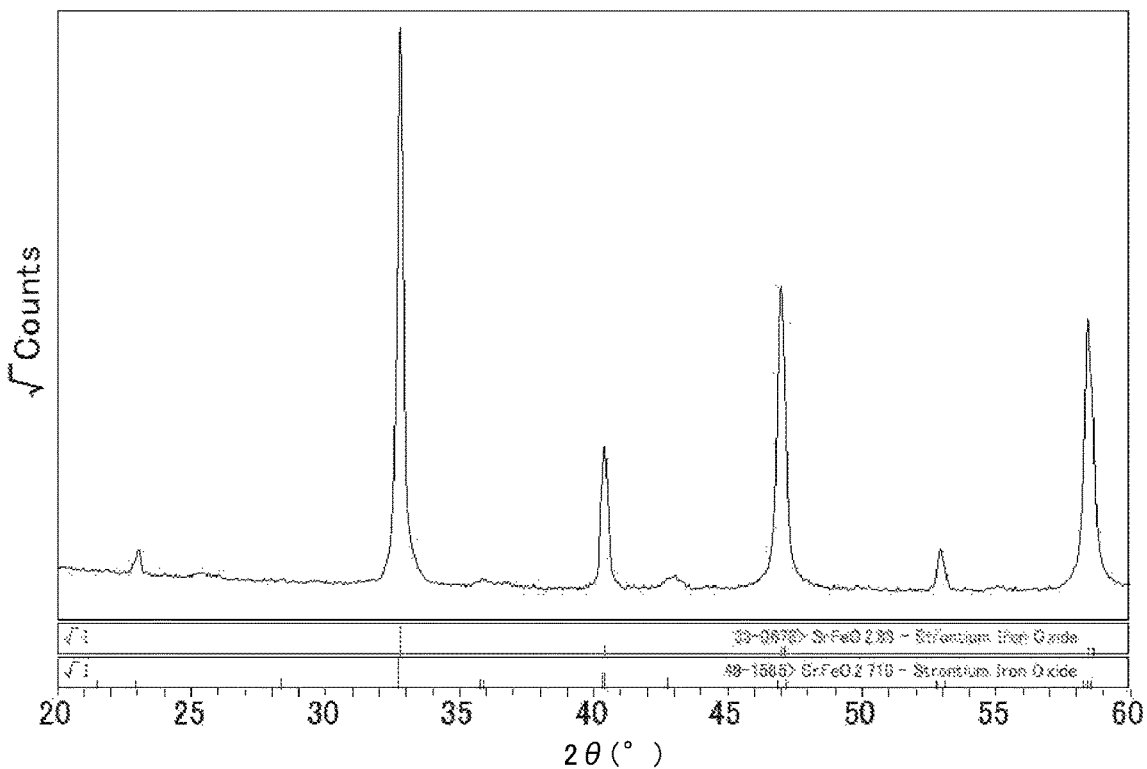
FIG. 9 illustrates an X-ray diffraction pattern of Experimental example 9.
Figure 10:
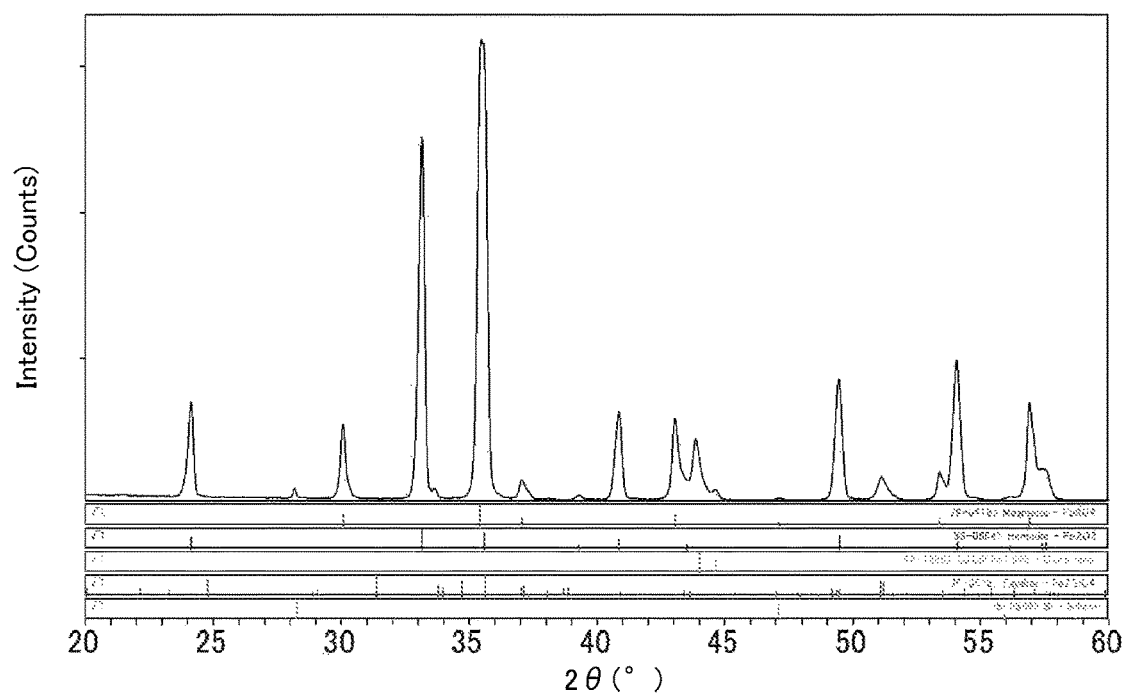
FIG. 10 illustrates an X-ray diffraction pattern of Experimental example 10.

The crystal phase of the joining portion of each of the joined bodies produced as described above was identified. The measurement was performed with a rotating anode X-ray diffractometer (RINT, manufactured by Rigaku Corporation). The metal member was removed from the joined body produced as described above to expose the joining portion. The resulting article was used as a measurement sample. An X-ray diffraction pattern of a surface of the joining portion was obtained. Conditions of the X-ray diffraction measurement were as follows: CuKα radiation source, 50 kV, 300 mA, and 2θ=20° to 60°. FIG. 8 illustrates an X-ray diffraction pattern of Experimental example 1. FIG. 9 illustrates an X-ray diffraction pattern of Experimental example 9. FIG. 10 illustrates an X-ray diffraction pattern of Experimental example 10. The resulting X-ray diffraction data was analyzed using "X-ray data analysis software JADE 7" manufactured by MDI. The results demonstrated that each of the joining portions of Experimental examples 1 to 9 was composed of a perovskite-type oxide phase, whereas each of the joining portions of Experimental examples 10 and 11 was not composed of a perovskite-type oxide phase. The proportion of the crystal phase was determined by a reference intensity ratio (RIR) method with "X-ray data analysis software JADE 7" manufactured by MDI.

(Joinability)

The joinability of each of the joined bodies was evaluated by SEM observation of a cross section of each joined body. The joined body produced as described above was embedded in a resin and polished to a nearly specular surface with, for example, a diamond slurry, thereby producing an observation sample. The sample is then observed with a SEM at a magnification of ×1500 or more to check the delamination between the joining portion and each of the porous ceramic and the metal member and the occurrence of cracking in the porous ceramic, the metal member, and the joining portion. The evaluation was performed according to the following criteria. The case where none of the delamination or the occurrence of the cracking were observed was rated as "A (excellent)". The case where significant delamination or cracking was observed was rated as "F (failure)".

(Joining Strength)

The joining strength of each of the joined bodies was evaluated by a tensile test (complying with JIS R1606). The case where the joining strength was 5.0 MPa or more was rated as "A (excellent)". The case where the joining strength was 3.0 MPa or more and less than 5.0 MPa was rated as "B (good)". The case where the joining strength was 1.5 MPa or more and less than 3.0 MPa was rated as "C (fair)". The case where the joining strength was less than 1.5 MPa was rated as "F (failure)".

(Electrical Conductivity)

Figure 11A:
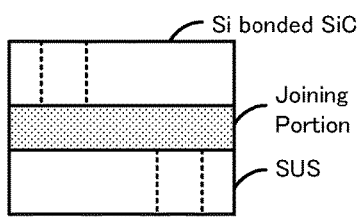
FIGS. 11A to 11C illustrate a joined body used in the measurement of electrical conductivity.
Figure 11B:
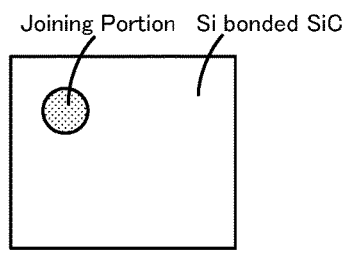
Figure 11C:
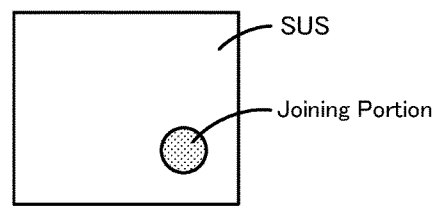
Figure 12:
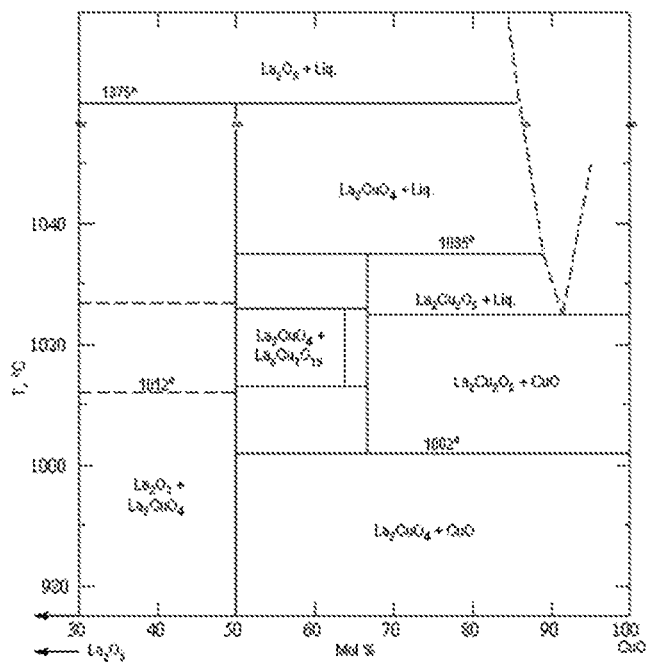
FIG. 12 is an equilibrium diagram of $La_2CuO_4$.
Figure 13:
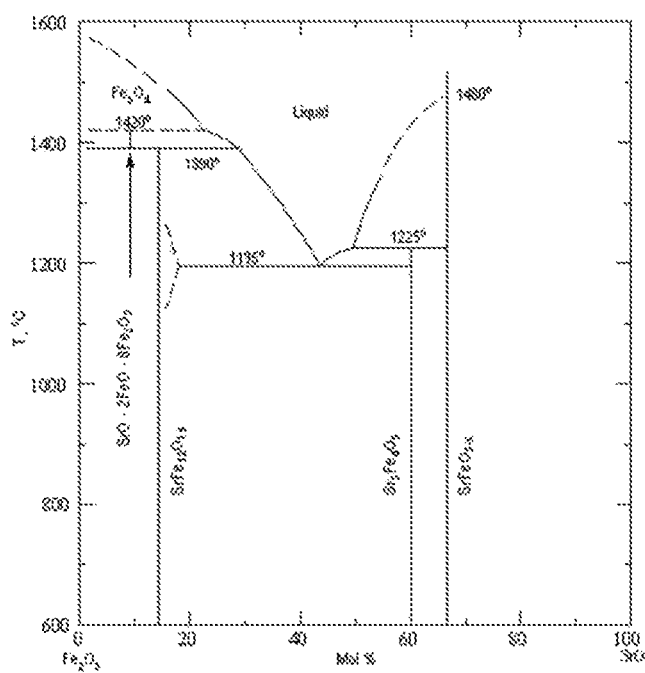
FIG. 13 is an equilibrium diagram of $Fe_2O_3$—SrO.
Figure 14:
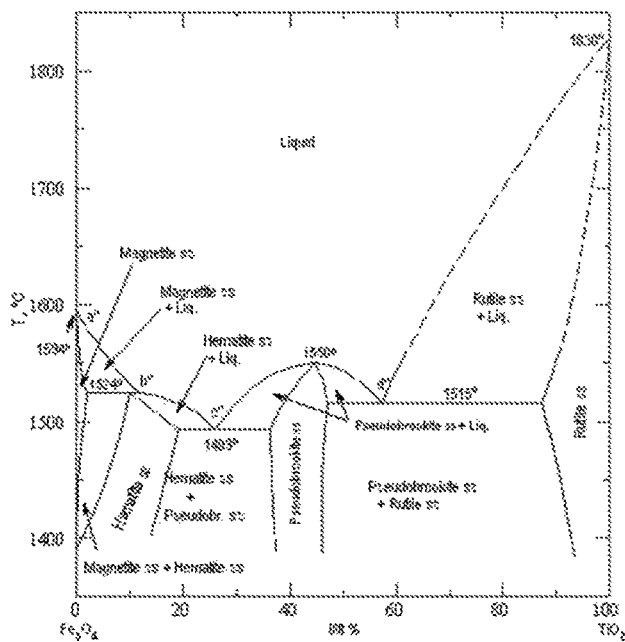
FIG. 14 is an equilibrium diagram of $Fe_2O_3$—$TiO_2$.
Figure 15:
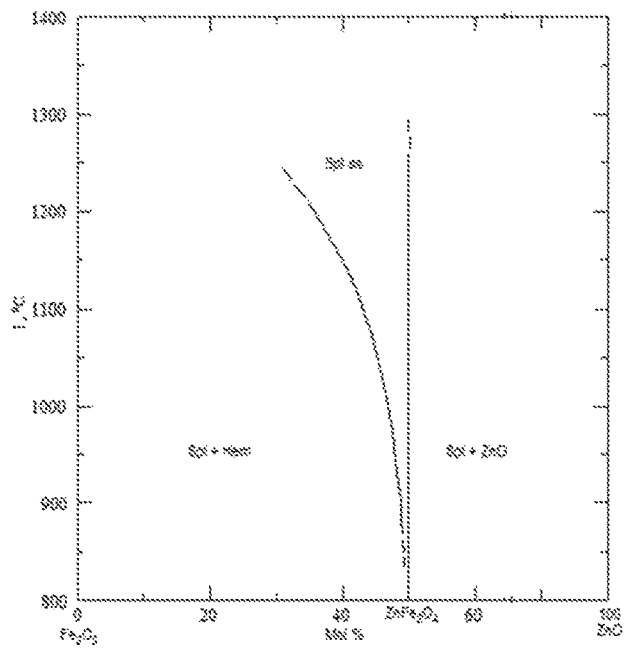
FIG. 15 is an equilibrium diagram of $Fe_2O_3$—$ZnO$.

The electrical conductivity of the joining portion was evaluated as described below. In the production of each of the joined bodies of Experimental examples 1 to 11, the stainless-steel (SUS) member and the Si-bonded SiC member each having a hole with a diameter of 2 mm were used. The stainless-steel (SUS) member and the Si-bonded SiC member were joined together in such a manner that the holes were alternately arranged (the holes were not superimposed) (see FIGS. 11A to 11C). A Ag paste (4922N, manufactured by du Pont) was applied to the joining portion (oxide layer) exposed through the hole having a diameter of 2 mm of the SUS member and the joining portion exposed through the hole having a diameter of 2 mm of the Si-bonded SiC member. The resulting green electrodes were dried to form electrodes for the measurement of electrical conductivity.

Needle-like terminals were pressed against the resulting measurement electrodes. An electrical resistance was measured by a direct-current two-terminal method. The volume resistivity r (Ωcm) was calculated from the expression r=R×S/L where R represents a measured electrical resistance (Ω), S represents the area of the measurement electrode (cm$^2$), and L represents an interelectrode distance (cm). The electrical conductivity ρ (Scm$^{-1}$) of electrode portions was calculated from the expression ρ=1/R. The evaluation of the electrical conductivity was performed before and after a heat resistance test. The heat resistance test was performed as described below. A current was allowed to pass through the electrode terminals of each measurement sample to heat the joined body to 800° C., and the sample was maintained at the temperature for 24 hours.

[Experimental Result]

Tables 1, 2, and 3 lists the proportions of the raw materials fed, the firing atmosphere, the firing temperature, the joinability, the joining strength, and the electrical conductivity of the joining portion (before and after the heat resistance test) of the joined bodies of Experimental examples 1 to 7, Experimental examples 8 and 9, and Experimental examples 10 and 11. In Experimental examples 10 and 11, in which the joining portions free from a perovskite-type oxide phase were provided, each of the joining portions had a low electrical conductivity of 0.4 S/cm or less before the heat resistance test and 0.05 S/cm or less after the heat resistance test. In contrast, in Experimental examples 1 to 9, in which the joining portions each containing the perovskite-type oxide phase were provided, each of the joining portions had a high electrical conductivity of at least 0.1 S/cm or more after the heat resistance test. The results demonstrated that the composite bodies each including the joining portion containing the perovskite-type oxide phase had higher electrical conductivity. In the composite bodies each including the joining portion containing the perovskite-type oxide phase, a decrease in electrical conductivity due to the heat resistance test was small. The reason for this is presumably as follows: For example, as is clear from equilibrium diagrams illustrated in FIGS. 12 to 15, in the perovskite-type oxide, a stable equilibrium phase itself has electrical conductivity, so that the electrical conductivity does not change with a change in temperature. In contrast, in the case of each of the materials of Experimental examples 10 and 11, in which the electrical conductivity was imparted by dissolving a different element to form solid solutions, a solid-solution range (composition range where materials can form a solid solution) changes with temperature, so that the electrical conductivity changes with a change in temperature.

TABLE 1

| | Proportion of Raw Material (mass %) | | | Firing Atmosphere | Firing Temperature (° C.) | Proportion of Crystal Phase of Joining Portion (%) | | 1) Joinability | 2) Joining Strength | The Electrical Conductivity of Joining Portion (S/cm) | |
|---|---|---|---|---|---|---|---|---|---|---|---|
| | Cu | La(OH)$_3$ | La$_2$CuO$_4$ | | | La$_2$CuO$_4$ | CuO | | | Before Heat Resistance Test | After Heat Resistance Test |
| Experimental Examples 1 | 14.3 | 85.7 | 0 | Air | 750 | 100 | 0 | A | A | 16 | 17 |
| Experimental Examples 2 | | | | Air | 800 | 100 | 0 | A | A | 16 | 16 |
| Experimental Examples 3 | | | | Ar | 1000 | 100 | 0 | A | A | 16 | 16 |
| Experimental Examples 4 | 0.0 | 0.0 | 100 | Ar | 800 | 100 | 0 | A | B | 16 | 17 |
| Experimental Examples 5 | | | | Ar | 900 | 100 | 0 | A | B | 16 | 16 |
| Experimental Examples 6 | 22.7 | 77.3 | 0 | Air | 800 | 91 | 9 | A | A | 3.2 | 3.0 |
| Experimental Examples 7 | 36.6 | 63.4 | 0 | Air | 800 | 73 | 27 | A | A | 0.1 | 0.1 |

1) A: excellent, F: failure
2) A: 5.0 MPa or more, B: 3.0 MPa or more and less than 5.0 MPa, C: 1.5 MPa or more and less than 3.0 MPa, F: less than 1.5 MPa

TABLE 2

| | Proportion of Raw Material (mass %) | | | Firing Atmosphere | Firing Temperature (° C.) | 1) Joinability | 2) Joining Strength | The Electrical Conductivity of Joining Portion (S/cm) | |
|---|---|---|---|---|---|---|---|---|---|
| | Fe | SrCO$_3$ | SrFeO$_3$ | | | | | Before Heat Resistance Test | After Heat Resistance Test |
| Experimental Example 8 | 27.4 | 72.6 | 0 | Air | 750 | A | A | 10 | 3.3 |
| Experimental Example 9 | 0 | 0 | 100.0 | Ar | 900 | A | B | 10 | 3.5 |

1) A: excellent, F: failure
2) A: 5.0 MPa or more, B: 3.0 MPa or more and less than 5.0 MPa, C: 1.5 MPa or more and less than 3.0 MPa, F: less than 1.5 MPa

TABLE 3

| | Proportion of Raw Material (mass %) | | | Firing Atmosphere | Firing Temperature (° C.) | 1) Joinability | 2) Joining Strength | The Electrical Conductivity of Joining Portion (S/cm) | |
|---|---|---|---|---|---|---|---|---|---|
| | Fe | TiO$_2$ | ZnO | | | | | Before Heat Resistance Test | After Heat Resistance Test |
| Experimental Example 10 | 98.9 | 1.1 | 0 | Air | 750 | A | A | 0.3 | 0.08 |
| Experimental Example 11 | 69.3 | 0 | 30.7 | Air | 800 | A | A | 0.4 | 0.01 |

1) A: excellent, F: failure
2) A: 5.0 MPa or more, B: 3.0 MPa or more and less than 5.0 MPa, C: 1.5 MPa or more and less than 3.0 MPa, F: less than 1.5 MPa Let us discuss the perovskite-type oxide phase. In Experimental examples 1 to 5, in which the perovskite-type oxide phase was the La$_2$CuO$_4$ phase, each of the joining portions had high electrical conductivity and a decrease in electrical conductivity due to the heat resistance test was small, compared with the Experimental examples 8 and 9, in which the perovskite-type oxide phase was FeSrO$_3$. The results demonstrated that the perovskite-type oxide phase containing La and Cu was more preferred.

Let us discuss the oxide layer raw material. In Experimental examples 1 to 3 and 6 to 8, in which the raw materials for synthesis were used, the joining strength was high, compared with Experimental examples 4, 5, and 9, in which the synthesized perovskite-type oxides were used. The results demonstrated that from the viewpoint of increasing the joining strength, the raw materials for synthesis, for example, the metal containing the metal contained in the perovskite-type oxide and the compound of the metal contained in the perovskite-type oxide, were more preferably contained. In the case where the raw materials for synthesis were used, the joined bodies were produced at low temperatures, compared with the cases where the synthesized perovskite-type oxide was used. The reason for this is presumably as follows: In the case where the raw materials for synthesis were used, for example, the expansion of the metal due to oxidation allows the oxide layer to penetrate into the pores of the target member to be joined to provide mechanical joining, thereby resulting in higher joining strength. In contrast, in the cases where the synthesized perovskite-type oxides were used, such mechanical joining was less likely to occur. Thus, the joining was attributed to substance diffusion alone.

Let us discuss the firing temperature. For example, in the case where Cu and La(OH)$_3$ were used as the oxide layer raw materials, the oxidation of Cu and the decomposition of La(OH)$_3$ proceeded more smoothly at 700° C. or higher. An unnecessary reaction did not occur at 1200° C. or lower, thus providing the good oxide layer. It was found that in the case where firing was performed in air, firing at 900° C. or higher allowed stainless steel (SUS) to oxidize; hence, the firing temperature was more preferably 900° C. or lower. It was found that in the case where firing was performed in the Ar atmosphere (low-oxygen atmosphere), the oxidation of stainless steel (SUS) was further inhibited, and the oxidation of Cu could proceed in trace amounts of oxygen; hence, the firing temperature was preferably 900° C. or higher and 1200° C. or lower. Similarly, in the case where Fe and SrCO$_3$ were used as the oxide layer raw materials, when firing was performed in air, the oxidation of Fe and the decomposition of SrCO$_3$ proceeded more smoothly at 700° C. or higher. An unnecessary reaction did not occur at 1200° C. or lower, thus providing the good oxide layer. It was found that in the case where firing was performed in air, firing at 900° C. or higher allowed stainless steel (SUS) to oxidize; hence, the firing temperature was more preferably 900° C. or lower. It was found that in the case where firing was performed in the Ar atmosphere (low-oxygen atmosphere), the oxidation of stainless steel (SUS) was further inhibited, and the oxidation of Fe could proceed in trace amounts of oxygen; hence, the firing temperature was preferably 900° C. or higher and 1200° C. or lower.

Let us discuss the proportion of the perovskite-type oxide phase. In Experimental example 7, in which the perovskite-type oxide phase was contained in a proportion of 73% by mass (70.8% by volume), the electrical conductivity was 0.1 S/cm or more before and after the heat resistance test. In Experimental example 6, in which the perovskite-type oxide phase was contained in a proportion of 91% by mass (90.1% by volume), the electrical conductivity was 3.0 S/cm or more. In Experimental example 2, in which the perovskite-type oxide phase was contained in a proportion of 100% by mass, the electrical conductivity was 16 S/cm or more. The results demonstrated that a higher proportion of the perovskite-type oxide phase resulted in higher electrical conductivity and that the perovskite-type oxide phase was preferably contained in a proportion of, for example, 70% by mass (67.7% by volume) or more, more preferably 75% by mass (72.9% by volume) or more, still more preferably 80% by mass (78.2% by volume) or more, and yet even more preferably 90% by mass (89.0% by volume) or more. In the case where the perovskite-type oxide phase was contained in a proportion of 45% by volume (47.7% by mass) or more, the electrical conductivity was presumed to be increased.

The joining portion is required to have, for example, characteristics as described below. (1) The joining portion has good joinability to both of the first member and the second member. (2) The joining portion does not react with the first member or the second member. Even if the joining portion reacts with the first member or the second member, no reaction phase that significantly reduces the joinability or the electrical conductivity is formed. (3) The joining portion has high electrical conductivity. (4) The joining portion is stable in air at room temperature to about 1000° C. (5) The joining portion has a thermal expansion coefficient close to those of both of the first member and the second member.

La$_2$CuO$_4$ used in Experimental examples 1 to 7 satisfies all requirements (1) to (5) described above. One reason for good joinability is presumably as follows: At an interface with Si-bonded SiC, Si diffuses continuously in the joining portion. At an interface with stainless steel (SUS), a component in SUS430 (for example, Mn) diffuses continuously in the joining portion. A good affinity between the materials that do not form a reaction phase having, for example, a significantly different thermal expansion coefficient at each interface seemingly results in better joinability.

SrFeO$_3$ used in Experimental examples 8 and 9 satisfies requirements (1) to (4). Although SrFeO$_3$ had a large thermal expansion coefficient, SrFeO$_3$ had good joinability when used for the joining portion. One reason for this is presumably as follows: In the case where Fe and $SrFeO_3$ were used as starting raw materials, a good balance was achieved between the volume expansion due to oxidation and reaction and contraction behavior associated with densification. Another reason for good joinability is presumably as follows: As with the case of $La_2CuO_4$, components diffuse continuously in the joining portion at both interfaces. A good affinity between the materials that do not form a reaction phase results in better joinability.

The present application claims priority from Japanese Patent Application No. JP 2015-057672, filed on Mar. 20, 2015, the entire contents of which are incorporated herein by reference.

What is claimed is:

1. A composite body comprising:
a honeycomb structure;
a first member;
a second member; and
a joining portion that joins the first member and the second member,
wherein at least one of the first member and the second member serves as a base, the joining portion is an oxide layer containing 70% or more by volume of a perovskite-type oxide phase, the base is formed on an outer circumferential surface of the honeycomb structure, and the joining portion is formed on an outer surface of the base.

2. The composite body according to claim 1, wherein at least one of part of a surface of the joining portion adjacent to the first member and part of a surface of the joining portion adjacent to the second member is exposed.

3. The composite body according to claim 1, wherein the joining portion that-covers the whole or part of a surface of the base.

4. The composite body according to claim 1, wherein the perovskite-type oxide phase is composed of at least one of an oxide containing La and Cu and an oxide containing Sr and Fe.

5. The composite body according to claim 1, wherein the perovskite-type oxide phase is composed of at least one of $La_2CuO_4$ and $SrFeO_3$.

6. The composite body according to claim 1, wherein the oxide layer is composed of a single-phase perovskite-type oxide.

7. The composite body according to claim 1, wherein the base is composed of at least one of a ceramic containing Si and an alloy containing Fe.

8. The composite body according to claim 1, wherein the oxide layer has an electrical conductivity of 0.1 S/cm or more.

9. The composite body according to claim 1, wherein the adhesion strength of the base to the oxide layer is 3.0 MPa or more.

10. The composite body according to claim 5, wherein the base is composed of at least one of a ceramic containing Si and an alloy containing Fe.

11. A method for producing a composite body comprising a honeycomb structure, comprising a step of:
firing a laminate including a joining portion raw material arranged between a first member and a second member to form a joining portion that joins the first member and the second member,
wherein at least one of the first member and the second member serves as a base, the joining portion is an oxide layer containing 70% or more by volume of a perovskite-type oxide phase, the base is formed on an outer circumferential surface of the honeycomb structure, and the joining portion is formed on an outer circumferential surface of the honeycomb structure.

12. The method for producing a composite body according to claim 11, wherein the method includes a step of firing a laminate including the joining portion raw material arranged on a surface of the base to form the joining portion that covers the whole surface of the base.

13. The method for producing a composite body according to claim 11, wherein the oxide layer is formed from a raw material that contains a metal powder and a compound powder.

14. The method for producing a composite body according to claim 13, wherein the compound powder is one or more selected from the group consisting of oxide powders, carbonate powders, hydroxide powders, and chloride powders.

15. The method for producing a composite body according to claim 13, the metal powder is composed of Cu and the compound powder is composed of $La(OH)_3$ or the metal powder is composed of Fe and the compound powder is composed of $SrCO_3$.

* * * * *